(12) United States Patent
Coppert (10) Patent No.: US 7,712,083 B2
(45) Date of Patent: May 4, 2010

(54) METHOD AND APPARATUS FOR MONITORING AND UPDATING SYSTEM SOFTWARE

(75) Inventor: Michael P. Coppert, Las Vegas, NV (US)

(73) Assignee: IGT, Reno, NV (US)

( * ) Notice: Subject to any disclaimer, the term of this patent is extended or adjusted under 35 U.S.C. 154(b) by 1127 days.

(21) Appl. No.: 10/645,889

(22) Filed: Aug. 20, 2003

(65) Prior Publication Data

US 2005/0044535 A1 Feb. 24, 2005

(51) Int. Cl.
*G06F 9/44* (2006.01)
*G06F 17/00* (2006.01)

(52) U.S. Cl. .......................................... 717/128; 463/42
(58) Field of Classification Search ................. 717/127, 717/106, 128–131; 713/201; 709/224, 217, 709/238, 203, 223; 714/4, 47; 463/42
See application file for complete search history.

(56) References Cited

U.S. PATENT DOCUMENTS

| | | | |
|---|---|---|---|
| 4,858,152 A | 8/1989 | Estes | |
| 5,483,468 A | 1/1996 | Chen et al. | |
| 5,665,081 A | 9/1997 | Grosse | |
| 5,675,798 A | 10/1997 | Chang | |
| 5,681,663 A | 10/1997 | Schaller et al. | |
| 5,726,912 A | 3/1998 | Krall, Jr. et al. | |
| 5,796,633 A | 8/1998 | Burgess et al. | |
| 6,154,128 A | 11/2000 | Wookey et al. | |
| 6,182,249 B1 | 1/2001 | Wookey et al. | |
| 6,321,263 B1* | 11/2001 | Luzzi et al. | 709/224 |
| 6,636,983 B1 | 10/2003 | Levi | |
| 6,813,733 B1* | 11/2004 | Li et al. | 714/47 |
| 7,017,071 B2* | 3/2006 | Katayama et al. | 714/4 |
| 7,246,156 B2* | 7/2007 | Ginter et al. | 709/217 |
| 7,260,645 B2* | 8/2007 | Bays | 709/238 |
| 7,555,528 B2* | 6/2009 | Rezvani et al. | 709/217 |
| 2002/0091991 A1* | 7/2002 | Castro | 717/106 |
| 2002/0169871 A1* | 11/2002 | Cravo de Almeida et al. | 709/224 |
| 2002/0184363 A1* | 12/2002 | Viavant et al. | 709/224 |
| 2003/0003997 A1* | 1/2003 | Vuong et al. | 463/42 |
| 2004/0015583 A1* | 1/2004 | Barrett et al. | 709/224 |
| 2005/0039171 A1* | 2/2005 | Avakian et al. | 717/127 |

(Continued)

FOREIGN PATENT DOCUMENTS

AU 2004210618 9/2004

(Continued)

OTHER PUBLICATIONS

Great Britain Examination Opinion and Search dated Dec. 22, 2004 in GB04204236.

(Continued)

*Primary Examiner*—Tuan Anh Vu
(74) *Attorney, Agent, or Firm*—Weaver Austin Villeneuve & Sampson LLP (57) ABSTRACT

A probe determines a value for a metric for a site. A message is generated, including the value for the metric, and is delivered to a monitoring apparatus. The monitoring apparatus determines if the value is acceptable, based on the metric and possibly the site that the probe is monitoring. If the value is not acceptable, then the monitoring apparatus displays an alert to a possible problem.

22 Claims, 8 Drawing Sheets

U.S. PATENT DOCUMENTS

2005/0182969 A1* 8/2005 Ginter et al. ............... 713/201

FOREIGN PATENT DOCUMENTS

| CA | 2481811 | 3/2006 |
| GB | 2414847 A | 12/2005 |
| GB | 2424086 | 9/2006 |
| WO | 00/65448 | 11/2000 |
| WO | 2003/090085 A3 | 10/2003 |
| WO | 2004/088604 A1 | 10/2004 |
| ZA | 20047452 | 5/2005 |

OTHER PUBLICATIONS

Great Britain Examination Opinion (restriction) dated Dec. 22, 2004 in GB04204236.
Great Britain Search and Examination Report dated Sep. 4, 2007 in GB04204236.
Great Britain Search and Examination Report dated Feb. 22, 2008 in GB04204236.
Great Britain Examination Report dated Jul. 23, 2008, from corresponding Great Britain Application No. 04204236.6.

* cited by examiner

METHOD AND APPARATUS FOR MONITORING AND UPDATING SYSTEM SOFTWARE

FIELD OF THE INVENTION

This invention pertains to monitoring software for a variety of conditions such as internal performance characteristics, liability warnings, programmatic errors and the general health of the computer system.

BACKGROUND OF THE INVENTION

No matter the computer program, it is inevitable that there will be some bugs (that is, coding errors that cause the program to behave differently what is expected). Production environments represent a number of variables that are difficult to reproduce in testing environments. As such, applications with thousands of interfaces can fail under a variety of changing variables.

Because human intervention is required to maintain these applications, certain tasks must be completed by operations on a timely basis. Failure to operate and maintain the system within the published guidelines for the application will result in a number of unacceptable issues. These include, but are not limited to the following: inaccurate reporting of revenues; increased risks associated with liability; increased risks with system availability; and increased costs due to additional manpower correction activities.

Customers want to know that their mission critical system is performing at peak levels of performance. They want to know when an area of the system is failing. They need to feel confident that the system and its integration with operations are running smoothly. Not knowing the health of the internal components of the system can create a false sense of security.

Another thing software companies sometimes do to eliminate defects is to find out about defects from customers. For a long time, customers had to make contact with the software companies (either by telephone or by e-mail) and let the software companies know about the bugs. More recently, as exemplified by Microsoft® Windows® XP, the operating system offers to send an error report to the software company when a program crashes. That way, the software company is informed about serious errors. (Microsoft and Windows are registered trademarks of Microsoft Corporation in the United States and other countries.)

Some third party products that monitor the operation of systems from the outside exist. For example, Netcool, by Micromuse, collects information from APIs, log files, and other utilities, and forwards this information to a server for filtering. Patrol, by BMC Software, offers remote monitoring and full-application management. But both of these products are external to the applications being monitored. These products focus primarily on external environments surrounding the application. They cannot detect the internal health of the application itself and thus their reporting value is limited in scope.

A need remains for a way to proactively detect application problems and software defects through monitoring internal application performance beyond that associated with the prior art.

SUMMARY OF THE INVENTION

The invention is an apparatus, system, and method for monitoring computers. A series of probes residing on a customer's computer determines values for metrics and sends these values to a monitoring apparatus. The monitoring apparatus determines if the values for the metrics are acceptable. If the values for the metrics are not acceptable, then an alert is displayed so that a corrective measures can be initiated.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
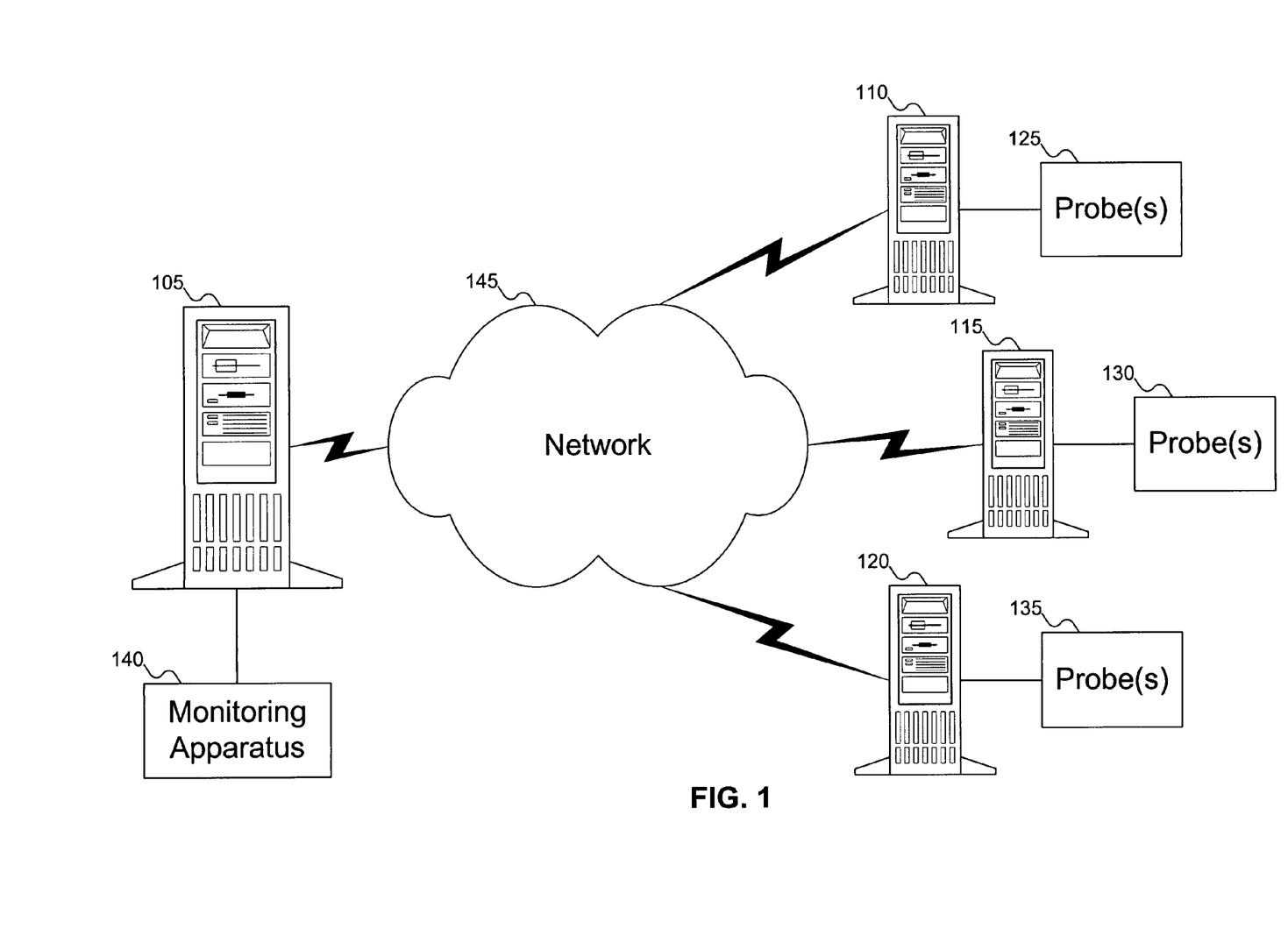
FIG. 1 shows a central server with a monitoring apparatus, communicating with probes on customer computers, according to an embodiment of the invention.

FIG. 1 shows a central server with a monitoring apparatus, communicating with probes on customer computers, according to an embodiment of the invention. In FIG. 1, server 105 is a central server. Server 105 is operated by the company distributing software products to its customers. Customers operate, for example, computers 110, 115, and 120. Although a person skilled in the art will recognize that there can be more or fewer than three customers, and that each customer can have more than one computer.

Installed on computers 110, 115, and 120 are probes 125, 130, and 135. Probes 125, 130, and 135 are responsible for determining the values associated with various metrics on computers 110, 115, and 120 respectively, and transmitting these values back to server 105. The details of probes 125, 130, and 135 are discussed further with reference to FIGS. 3-4 below.

Server 105 includes monitoring apparatus 140. Monitoring apparatus 140 receives information from probes 125, 130, and 135, and determines whether the data received from the probes represent acceptable values. If the values are acceptable, then monitoring apparatus 140 logs the values. Otherwise, monitoring apparatus displays 140 an alert, indicating the unacceptable value. The details of monitoring apparatus 140 are discussed further with reference to FIG. 2 below.

Connecting server 105 with computers 110, 115, and 120 is network 145. Network 145 can be any variety of network including, among others, a local area network (LAN), a wide area network (WAN), a global network (such as the Internet), and a wireless network (for example, using Bluetooth or any of the IEEE 802.11 standards). In addition, a person skilled in the art will recognize that different networks can be used to connect server 105 with different computers. For example, server 105 might be connected to computer 110 using one network, and to computers 115 and 120 using a second network.

Figure 2:
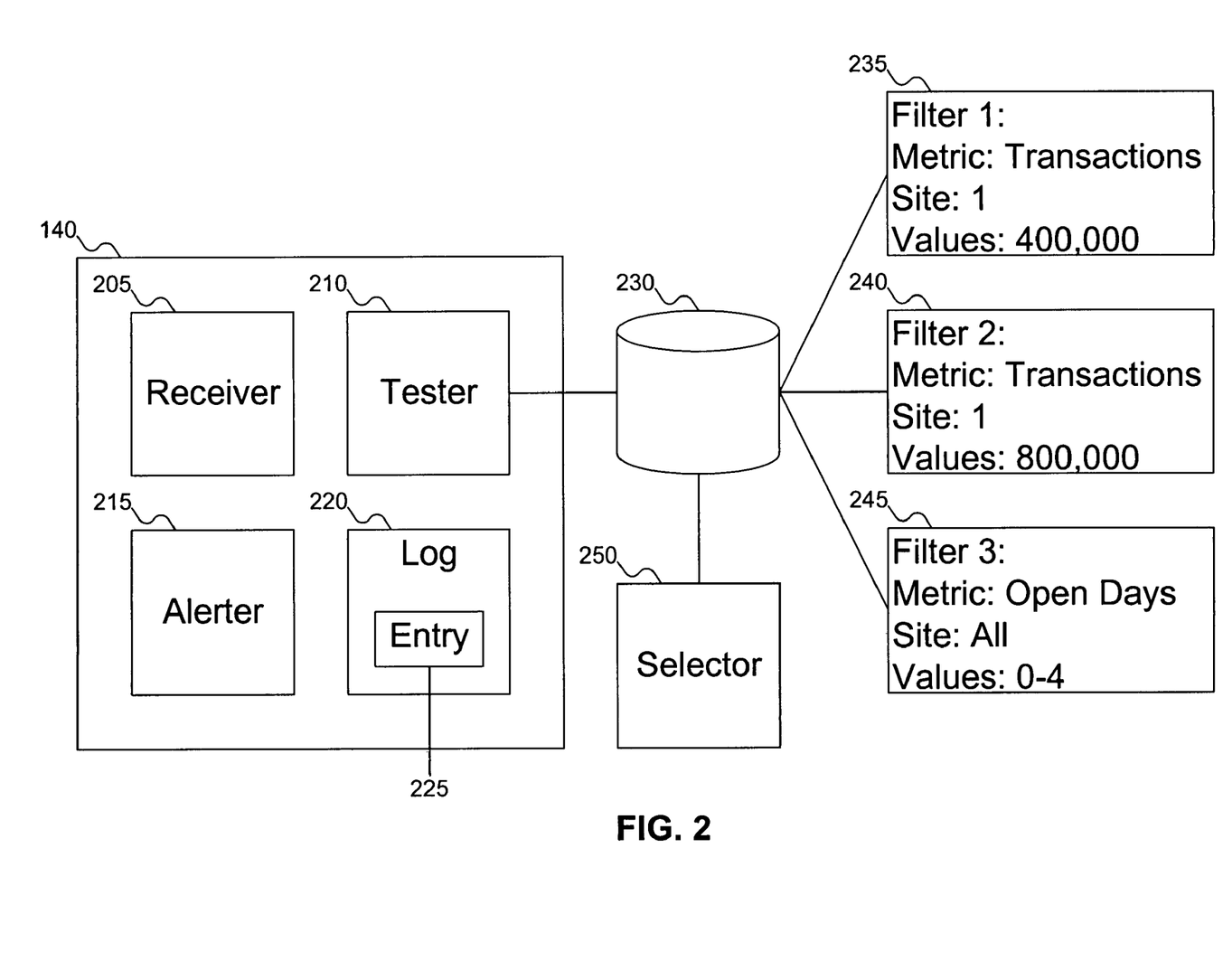
FIG. 2 shows details of the monitoring apparatus of FIG. 1.

FIG. 2 shows details of the monitoring apparatus of FIG. 1. Monitoring apparatus 140 includes four components: receiver 205, tester 210, alerter 215, and log 220. Receiver 205 is responsible for receiving a message from a probe and parsing the message for the necessary information. Tester 210 then tests the value (or values) retrieved from the message received by receiver 205 to determine if the value is acceptable. Alerter 215 displays an alert is the value retrieved from the message is not acceptable. And log 220 includes entries, like entry 225, which reflect the received message, its values, and/or whether the value is acceptable.

To determine whether a value is acceptable, monitoring apparatus 140 uses database 230. Database 230 includes filters, such as filters 235, 240, and 245, which identify what values are considered acceptable. Different filters exist for different metrics. For example, filter 235 is a filter for the number of transactions occurring at a given location, whereas filter 245 is a filter for the number of open days experienced at a location.

Some filters, such as filter 245, can be used for all casino locations. But other metrics, such as the number of transactions, can vary from one location to another. To account for differing interpretations of acceptable values, different filters can be set up for a single metric, each filter identifying acceptable values for a different casino location. Thus, while filters 235 and 240 both represent acceptable values for the transactions metric, they represent acceptable values for different casinos.

Although a different filter can be set up for each different site for a given metric, the amount of variation in acceptable values might be limited. Where two or more sites agree on what constitutes an acceptable value for a given metric, there is no need for each site to have a separate filter. Thus, while FIG. 2 shows filters 235 and 240 being used for individual sites, a person skilled in the art will recognize that a single filter can be used for some (but not necessarily all) sites.

To select the appropriate filter, monitoring apparatus 140 uses selector 250. Selector 250 uses information from the message to select the appropriate metric. Selector 250 determines the metric represented in the message and, if necessary, the site from which the metric was measured. Selector 250 then uses these pieces of information to find the appropriate filter in database 230, so that tester 210 can determine if the value is acceptable.

Figure 3:
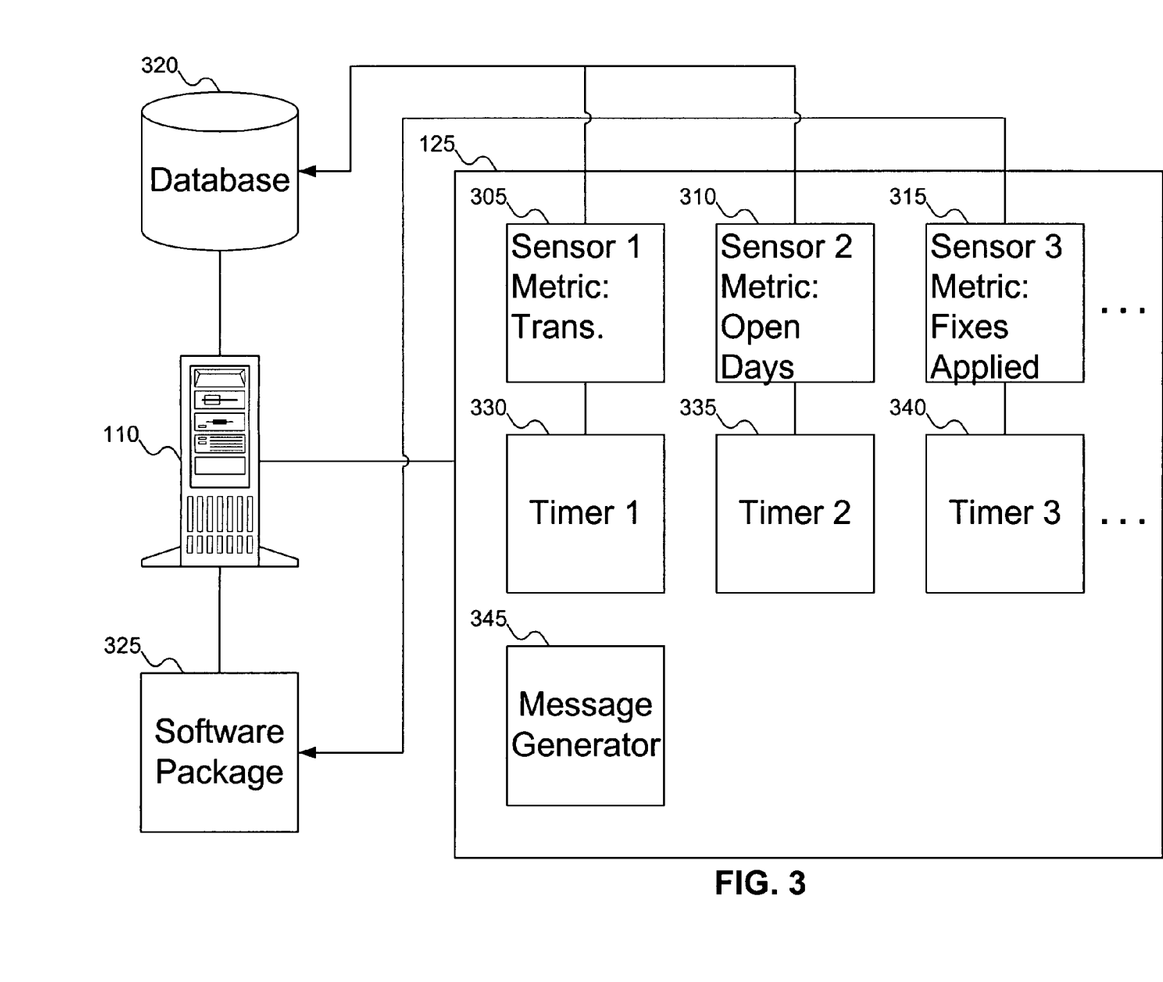
FIG. 3 shows details of the probes of FIG. 1.

FIG. 3 shows details of the probes of FIG. 1. In FIG. 3, probe 125 includes sensors 305, 310, and 315. Each sensor operates to determine values for different metrics for computer 110. For example, sensor 305 determines the number of transactions that occur in a given day in database 320 on computer 110, sensor 310 determines the number of open days at the site, and sensor 315 determines the number of fixes applied to software 325 on computer 110. A person skilled in the art will recognize that although three sensors are shown within probe 125, there can be fewer or more sensors in a given probe. In addition, there can be more than one probe for a given computer, each with the same or differing numbers of sensors.

Because sensor measurements are taken more than once, each of sensors 305, 310, and 315 includes a corresponding timer 330, 335, and 340. The timers ensure that the sensors take measurements according to regular schedules. Each timer can be set to measure a metric using different intervals. But a person skilled in the art will recognize that, for sensors measuring metrics according to consistent schedules, a single timer can be used for more than one sensor.

Additionally, sensors can trigger on two different mechanisms. They can be triggered on a timer or they can be triggered by an impromptu event. The latter is utilized to signal immediate attention to a critical event that has just taken place.

Finally, probe 125 includes message generator 345. Message generator 345 takes the measurements from the various sensors 305, 310, and 315, and assembles a message from the measurements. The message is then sent to the central server (not shown in FIG. 3). Message generator 345 can generate a single message for several metric measurements, or message generator 345 can generate a separate message for each metric measurement.

Figure 4:
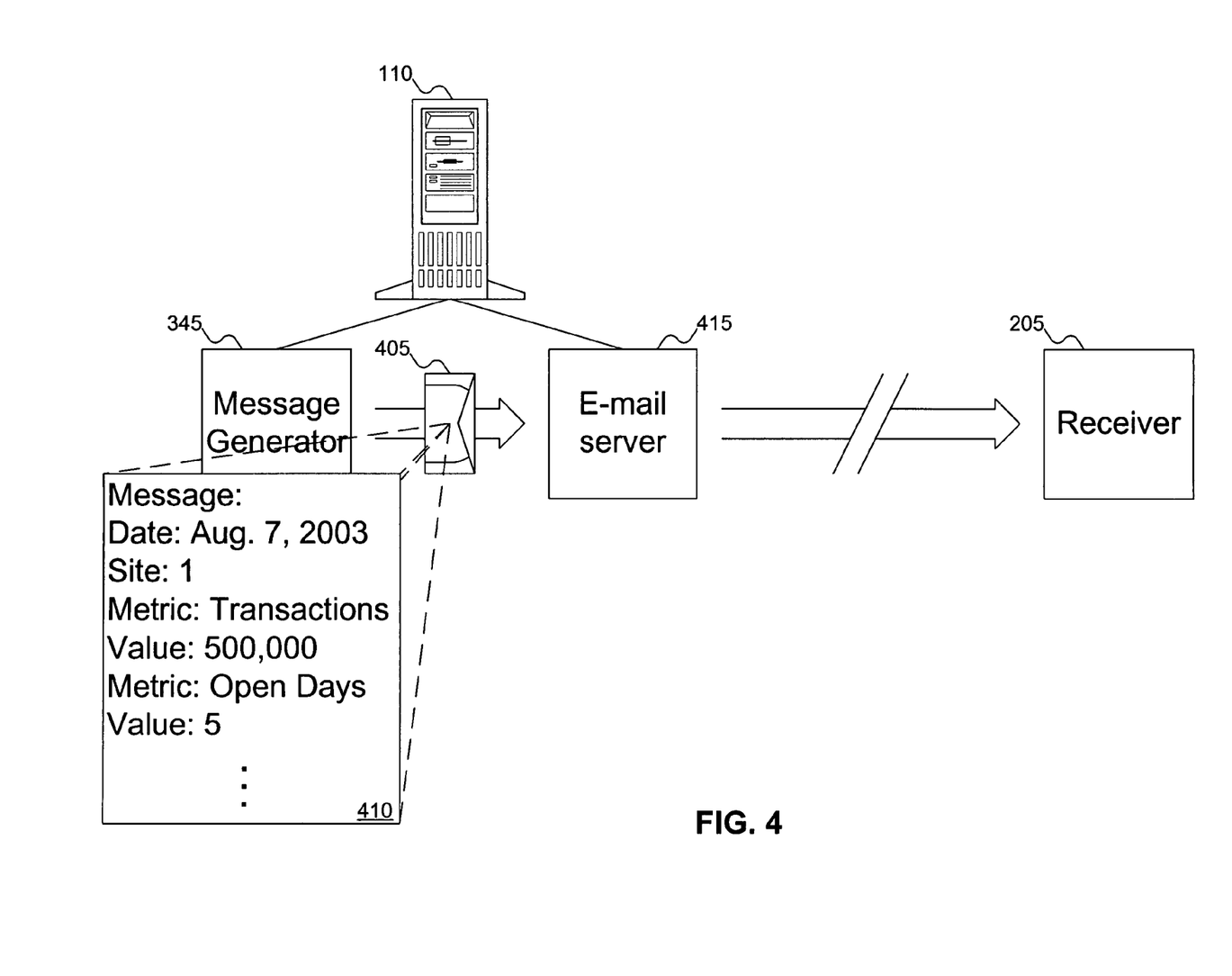
FIG. 4 show the probes of FIG. 1 communicating with the monitoring apparatus of FIG. 1.

FIG. 4 show the probes of FIG. 1 communicating with the monitoring apparatus of FIG. 1. In FIG. 4, message generator 345 is shown generating message 405. Message 405 is shown in greater detail in blow-up 410. The message is dated Aug. 7, 2003, and is from site 1 (which includes computer 110). Blow-up 410 shows two metric measurements. The site has measured 500,000 transactions, and has five open days. There can also be other metrics included in the message.

Once message 405 is generated, it is delivered to e-mail server 415. E-mail server is responsible for starting message 405 along its journey to receiver 205 in the central server. Although shown as a component of computer 110, a person skilled in the art will recognize that e-mail server 415 can be part of a separate computer, distinct from computer 110, or can be a dedicated e-mail server. A typical implementation would most likely utilize the customer's existing e-mail implementation. This will provide a number of benefits including a cost savings through the elimination of a second server along with cost avoidance of supporting and maintaining the additional hardware.

Figure 5:
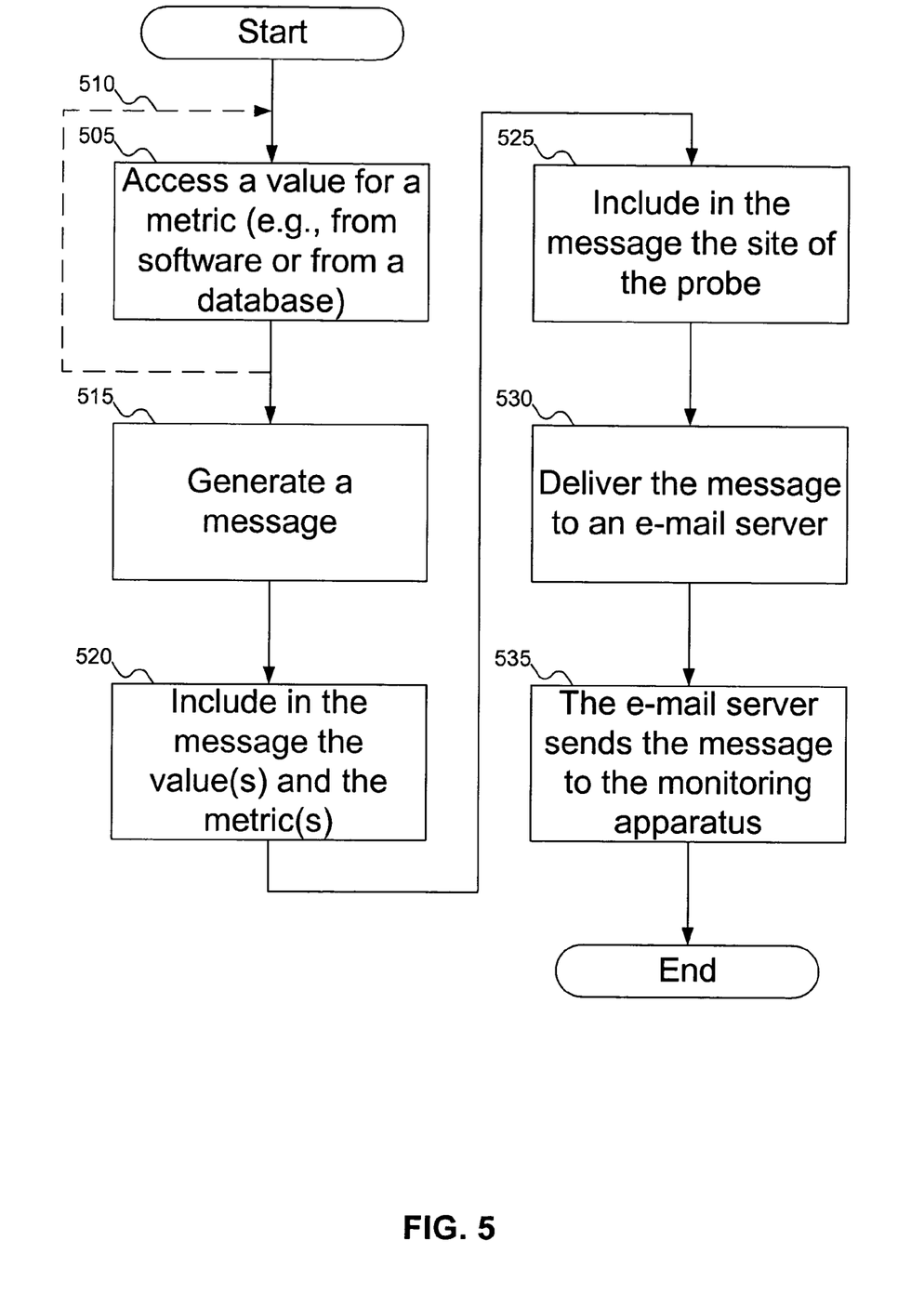
FIG. 5 shows a flowchart of the procedure for using the probes of FIG. 1.

FIG. 5 shows a flowchart of the procedure for using the probes of FIG. 1. At step 505, the probe accesses a value for a metric. The value can be accessed from a database or from software. As shown by arrow 510, step 505 can be repeated as often as necessary, to access values for multiple metrics. At step 515, a message is generated. At step 520, the message includes the value for the metric accessed in step 505. At step 525, the site is included in the message, so that the central server knows from where the message originated. At step 530, the message is delivered to the e-mail server, and at step 535, the message is sent to the monitoring apparatus by the e-mail server.

Figure 6A:
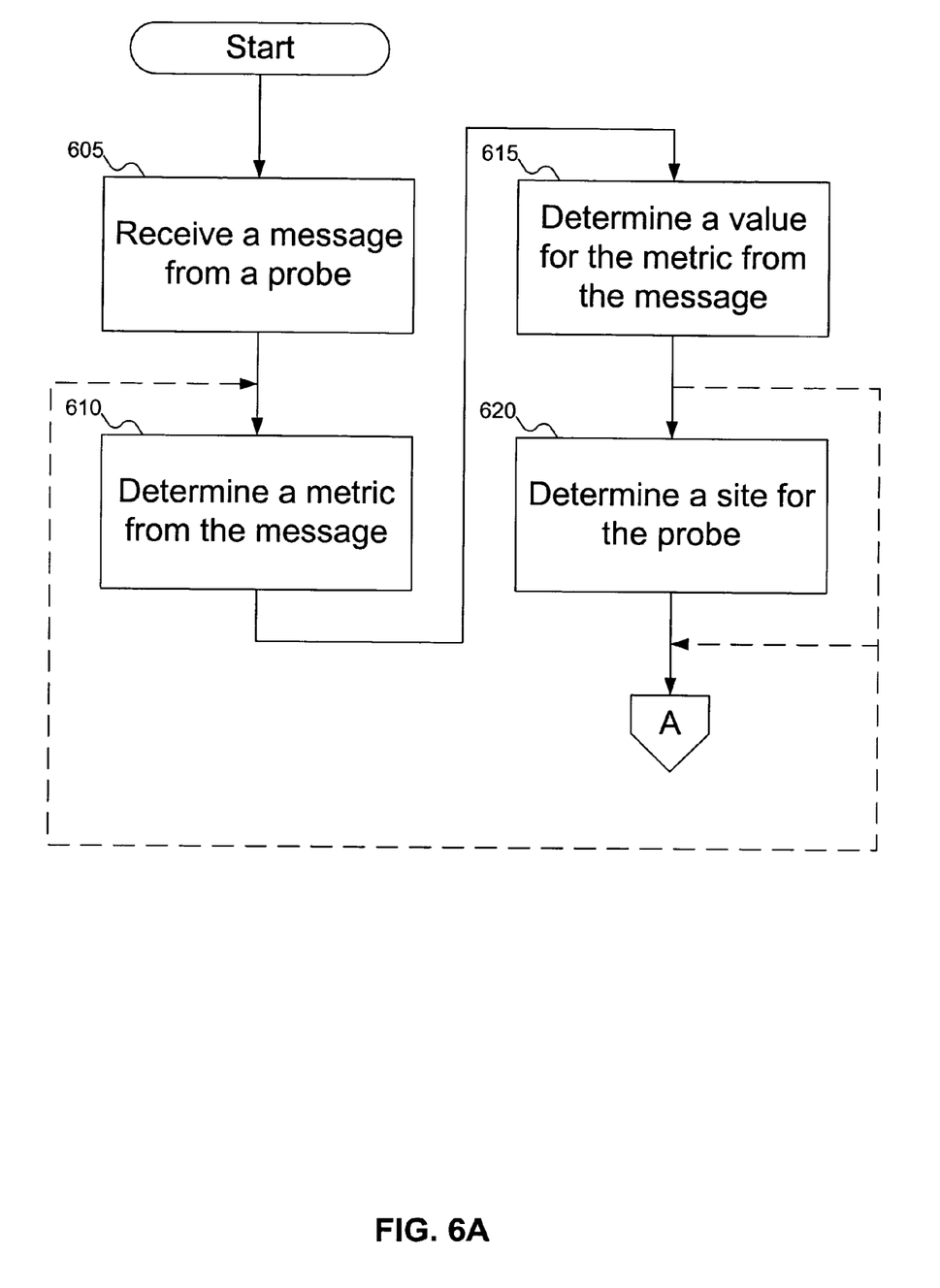
FIGS. 6A-6C show a flowchart of the procedure for using the monitoring apparatus of FIG. 1.
Figure 6B:
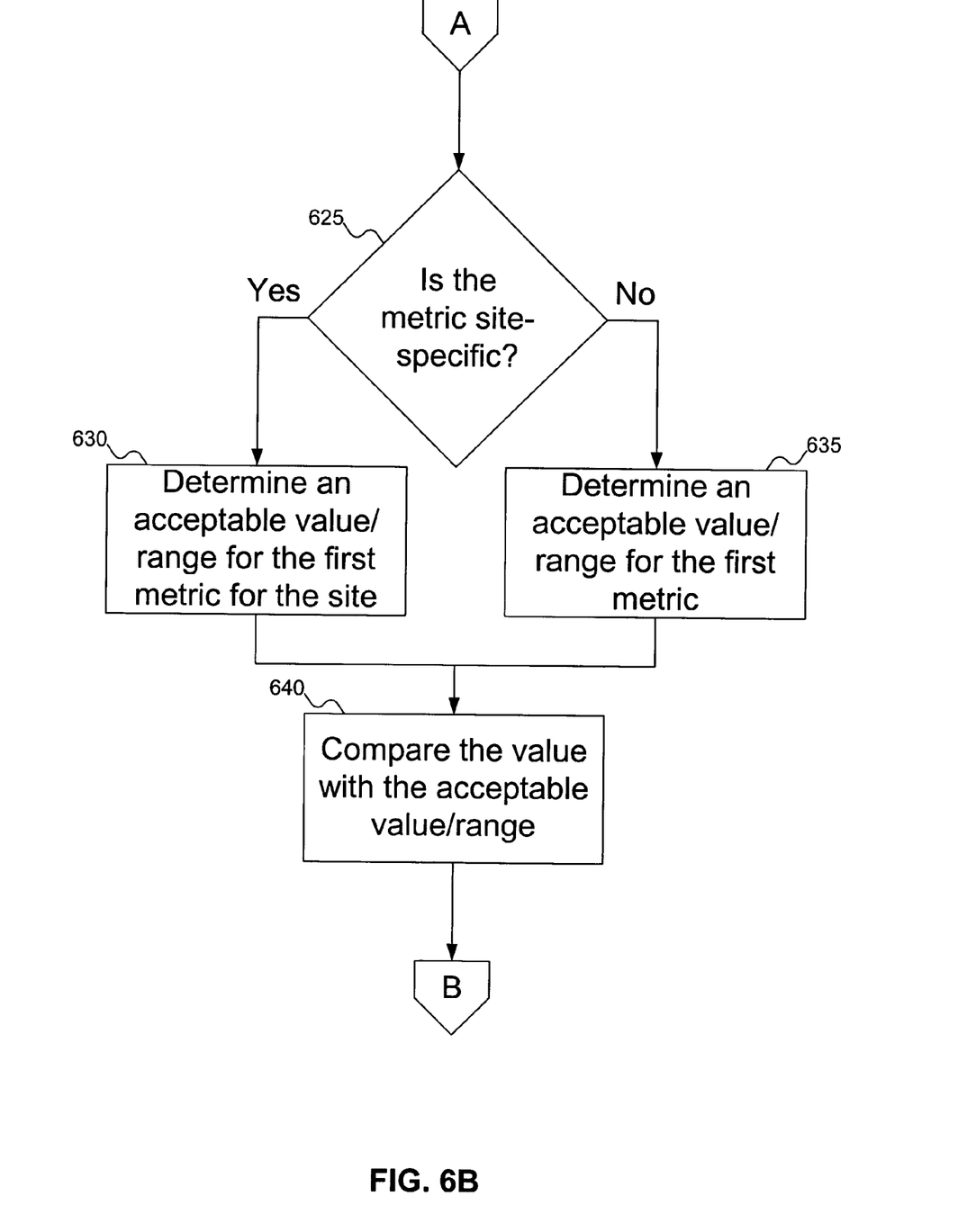
Figure 6C:
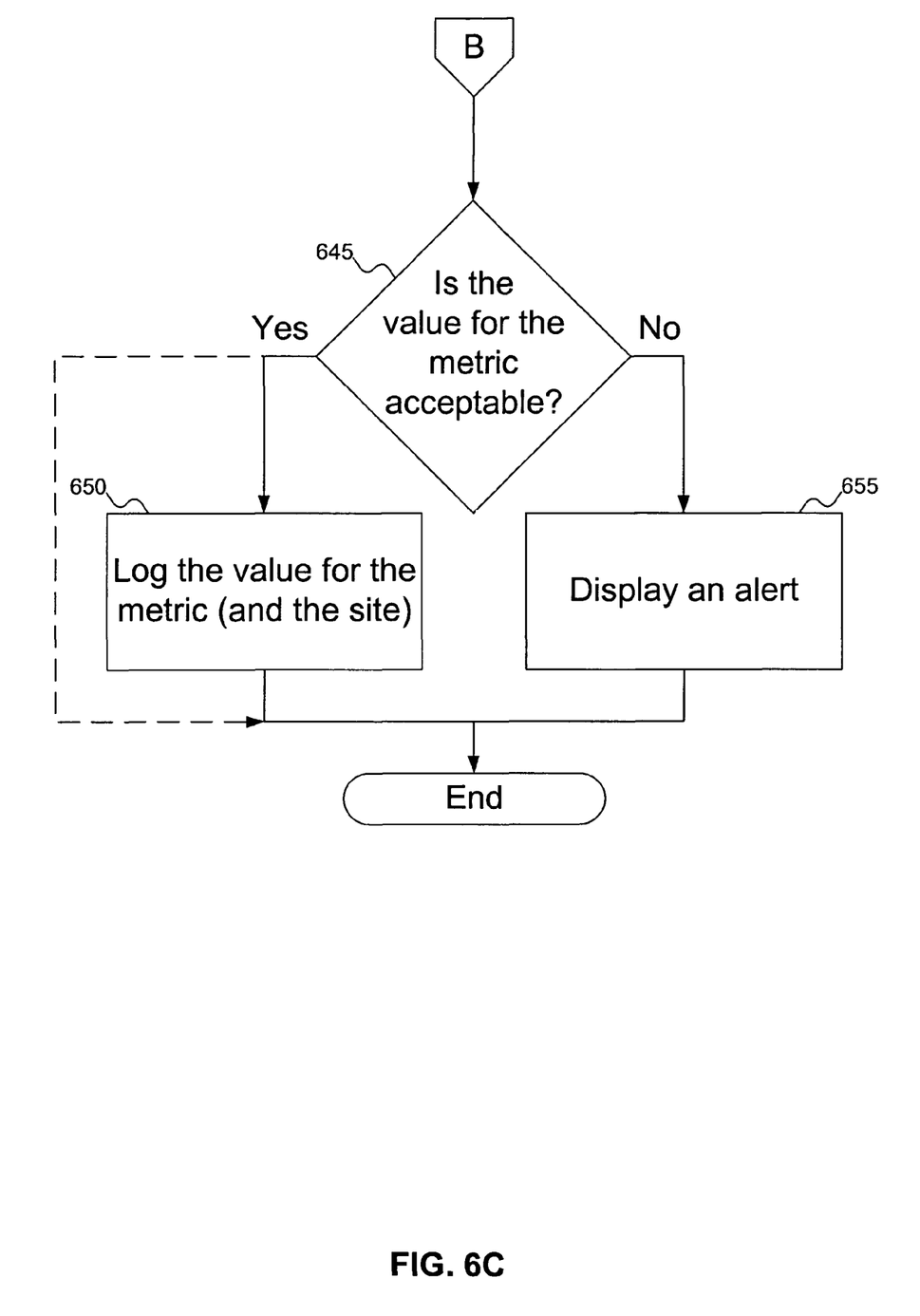

FIGS. 6A-6C show a flowchart of the procedure for using the monitoring apparatus of FIG. 1. In FIG. 6A, at step 605, the monitoring apparatus receives a message from a probe. At step 610, the metric is determined from the message. At step 615, a value for the metric is determined. At step 620, a site for the probe is determined.

At step 625 (FIG. 6B), the monitoring apparatus determines if the metric is site-specific. If the metric is site specific, then at step 630 the monitoring apparatus determines an acceptable value or range of values for the metric/site combination. Otherwise, at step 635, the monitoring apparatus determines an acceptable value or range of values for the metric, without regard to the site of the probe. Either way, at step 640, the system compares the value from the message with the acceptable value/range.

At step 645 (FIG. 6C), the monitoring apparatus determines if the value for the metric is acceptable. If the value is acceptable, then at step 650 the monitoring apparatus logs the value for the metric and the site from which the value was received. Otherwise, at step 655, the monitoring apparatus displays an alert, letting someone know about a potential problem.

As shown in FIG. 6A, certain steps can be omitted or repeated. For example, since a single message can include values for multiple metrics, steps 610 and 615 can be repeated. Also, if the metrics are not site-specific, step 620 can be omitted (although typically the site is transmitted as part of the message, even if the metric is not site-specific). Finally, as shown on FIG. 6C, if the value for the metric is acceptable, the value does not need to be logged, although, again, typically the value is logged.

A person skilled in the art will recognize that an embodiment of the invention described above can be implemented using a computer. In that case, the method is embodied as instructions that make up a program. The program may be stored on computer-readable media, such as floppy disks, optical discs (such as compact discs), or fixed disks (such as hard drives), and can be resident in memory, such as random access memory (RAM), read-only memory (ROM), firmware, or flash RAM memory. The program as software can then be executed on a computer to implement the method. The program, or portions of its execution, can be distributed over multiple computers in a network.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. A monitoring apparatus for monitoring casino management software including a central server operable to communicate via a communications network with a plurality of computers at different casino sites remote from the central server, the plurality of computers at different casino sites including a first computer at a first site, the central server including memory, at least one processor, and a first communication interface, the monitoring apparatus comprising:
   a message receiver at the central server operable to receive, via the first communication interface, a first message from the first computer at the first site in a casino location remote from the central server, the first computer communicatively coupled with the communications network, the first computer including memory, at least one processor, a second communication interface, and instructions for operating a probe installed in the first computer and operable to monitor software running on the first computer, the probe being configured to:
      determine, at scheduled times, a first value for a first metric, the first metric relating to operating status information associated with one or more applications running at the first computer,
      generate the first message, the first message including the first value for the first metric, the first message also including an indication of the first site, the indication of the first site including information that identifies the first site, and
      transmit, via the second communication interface at the first computer, the first message to the central server;
   a tester implemented using the memory and the at least one processor at the central server, the tester configured to determine, in response to receiving the first message via the message receiver, if the first value is acceptable, wherein the tester includes a plurality of filters, each of the plurality of filters defining a range of acceptable values for the first metric, the tester being operative to compare the first value with the range of acceptable values for one or more of the plurality of filters;
   a selector implemented using the memory and the at least one processor at the central server, the selector configured to select, in response to receiving the first message via the message receiver and based on the first metric in the first message and the indication of the first site in the first message, a first filter from the plurality of filters, the first filter defining a range of acceptable values for the first metric associated with the first site; and
   an alerter at the central server configured to provide an alert if the first value is not acceptable.

2. A monitoring apparatus according to claim 1, further comprising a log, the log including an entry corresponding to the first message.

3. A monitoring apparatus according to claim 1, wherein the central server and the remote computer are controlled by different entities.

4. A monitoring apparatus according to claim 1, wherein the operating status information includes information allowing the central server to determine whether one or more application problems or software defects exists in one or more of the applications running at the first computer.

5. A system for monitoring casino management software including a central computer in communication via a communications network with a plurality of computers at different casino sites remote from the central computer, the plurality of computers at different casino sites including a first computer at a first site, the system comprising:
   the communications network operable to transmit communications between the central computer and the plurality of computers at different casino sites;
   the central computer including memory, at least one processor, and a first communication interface, and the central computer communicatively coupled with the communications network via the first communication interface, the central computer further including instructions for controlling a monitoring apparatus installed in the central computer, the monitoring apparatus including:
      a message receiver operable to receive, via the first communication interface, a first message from the first site in a casino location remote from the central computer, the first message including a first value for a first metric, the first message also including an indication of the first site, the indication of the first site including information that identifies the first site,
      a tester implemented using the memory and the at least one processor at the central computer, the tester configured to determine, in response to receiving the first message via the message receiver, if the first value is acceptable, the tester including a plurality of filters, each of the plurality of filters defining a range of acceptable values for the first metric, the tester being operative to compare the first value with the range of acceptable values for one or more of the plurality of filters, and
      a selector implemented using the memory and the at least one processor at the central computer, the selector configured to select, in response to receiving the first message via the message receiver, a first filter from the plurality of filters based on the first metric in the first message and the indication of the first site in the first message, the first filter defining a range of acceptable values for the first metric associated with the first site, and an alerter configured to provide an alert if the first value is not acceptable;
   the first computer at the first site communicatively coupled with the communications network, the first computer including memory, at least one processor, a second communication interface, and instructions for operating a first probe installed in the first computer and operable to monitor software running on the first computer, the first probe configured to:
      determine, at scheduled times, the first value for the first metric, the first metric relating to operating status information associated with one or more applications running at the first computer, generate the first message, the first message including the first value for the first metric, and transmit, via the second communication interface, the first message to the central computer.

6. A system according to claim 5, the system further comprising:

a second computer communicatively coupled with the communications network, the second computer including memory, at least one processor, a third communication interface, and instructions for operating a second probe installed in the second computer.

7. A system according to claim 5, wherein:

the first computer includes a software package; and the first probe monitors the software package.

8. A system according to claim 5, wherein:

the first computer includes a database; and the first probe is configured to retrieve information from the database.

9. A system according to claim 5, wherein:

the first probe includes:

a first sensor to capture a first value for a first metric; and a message generator operative to send a first message to a central site, the message including the first value.

10. A system according to claim 5, wherein the first computer includes an e-mail server to generate a message from the first probe to the monitoring apparatus.

11. A method for using a monitoring apparatus for monitoring casino management software, the monitoring apparatus implemented using a central server having memory, at least one processor, and a first communication interface, the central server in communication via a communications network with a plurality of computers at different casino sites remote from the central server, the plurality of computers at different casino sites including a first computer at a first site, the method comprising:

receiving, via the first communication interface at the central server, a message from the first computer at the first site;

determining, using the memory and the at least one processor at the central server, a first value for a first metric for the first computer at the first site, the first site being in a casino location remote from the central server, the first computer communicatively coupled with the communications network, the first computer including memory, at least one processor, a second communication interface, and instructions for operating a probe installed on the first computer, the probe being configured to:

determine, at scheduled times, information related to the first value for the first metric, the first metric relating to operating status information associated with one or more applications running at the first computer, and generate the first message, the first message including the information related to the first value for the first metric, the first message also including an indication of the first site, the indication of the first site including information that identifies the first site, and transmit, via the second communication interface, the first message to the central server;

determining, using the memory and the at least one processor at the central server, if the first value for the first metric for the first site is acceptable, wherein the determining involves selecting, in response to receiving the first message via the message receiver and based on the first metric in the first message and the indication of the first site in the first message, a first filter from a plurality of filters, each of the plurality of filters defining a range of acceptable values for the first metric, the first filter defining a range of acceptable values for the first metric associated with the first site, and comparing the first value with the range of acceptable values for the first filter; and if the first value for the first metric is not acceptable, displaying an alert at the central server that the first value for the first metric is not acceptable.

12. A method according to claim 11, further comprising, if the first value for the first metric is acceptable, logging the first value for the first metric.

13. A method according to claim 11, wherein determining if the first value for the first metric is acceptable includes comparing the first value for the first metric with at least one acceptable value.

14. A method according to claim 11, wherein sending the message includes:

delivering the message to an e-mail server by the probe; and delivering the message to the monitoring apparatus by the e-mail server.

15. A method according to claim 11, wherein determining information related to the first value includes accessing a software package by the probe.

16. A method according to claim 11, wherein determining information related to the first value includes accessing a database by the probe.

17. Computer-readable storage media containing a program to use a monitoring apparatus for monitoring casino management software including a central server having memory, at least one processor, and a first communication interface, the central server in communication via a communications network with a plurality of computers at different casino sites remote from the central server, the plurality of computers at different casino sites including a first computer at a first site, the program comprising:

software at the central server to receive, via the first communication interface at the central server, a first message from the first computer at the first site in a casino location remote from the central server;

software at the central server to determine, using the memory and the at least one processor at the central server, a first value for a first metric for the first computer at the first site, the first computer communicatively coupled with the communications network, the first computer including memory, at least one processor, a second communication interface, and instructions for operating a probe installed on the first computer, the probe being configured to:

determine, at scheduled times, information related to the first value for the first metric, the first metric relating to operating status information associated with one or more applications running at the first computer, generate the first message, the first message including the information related to the first value for the first metric, the first message also including an indication of the first site, the indication of the first site including information that identifies the first site, and transmit, via the second communication interface, the first message to the central server;

software instructing the memory and the at least one processor at the central server to determine if the first value for the first metric for the first site is acceptable, wherein the determining involves selecting, in response to receiving the first message via the message receiver and based on the first metric in the first message and the indication of the first site in the first message, a first filter from a plurality of filters, each of the plurality of filters defining a range of acceptable values for the first metric, the first filter defining a range of acceptable values for the first metric associated with the first site, and comparing the first value with the range of acceptable values for the first filter; and if the first value for the first metric is not acceptable, software at the central server to display an alert that the first value for the first metric is not acceptable.

18. Computer-readable media according to claim 17, further comprising, if the first value for the first metric is acceptable, software to log the first value for the first metric.

19. Computer-readable media according to claim 17, wherein the software to receive a message includes:

software to access the first value for the first metric by the probe; and software to send the message to the monitoring apparatus by the probe.

20. Computer-readable media according to claim 19, wherein the software to send the message includes:

software to deliver the message to an e-mail server by the probe; and software to deliver the message to the monitoring apparatus by the e-mail server.

21. Computer-readable media according to claim 19, wherein the software to access the first value includes software to access a software package by the probe.

22. Computer-readable media according to claim 19, wherein the software to access the first value includes software to access a database by the probe.

* * * * *